US 8,860,277 B2

(12) United States Patent
Kimiabeigi

(10) Patent No.: US 8,860,277 B2
(45) Date of Patent: Oct. 14, 2014

(54) STATOR COIL SEGMENT FOR AN ELECTRO MECHANICAL TRANSDUCER, IN PARTICULAR A GENERATOR AND ELECTRO MECHANICAL TRANSDUCER, IN PARTICULAR ELECTRIC GENERATOR

(75) Inventor: Mohammad Kimiabeigi, Sheffield (GB)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 13/413,745

(22) Filed: Mar. 7, 2012

(65) Prior Publication Data

US 2012/0228982 A1 Sep. 13, 2012

(30) Foreign Application Priority Data

Mar. 8, 2011 (EP) ...................................... 11157316

(51) Int. Cl.
*H02K 1/00* (2006.01)
*H02K 3/18* (2006.01)
*H02K 3/28* (2006.01)
*H02K 7/18* (2006.01)
*H02K 1/14* (2006.01)

(52) U.S. Cl.
CPC ................. *H02K 3/28* (2013.01); *Y02E 10/725* (2013.01); *H02K 7/183* (2013.01); *H02K 7/1838* (2013.01); *H02K 3/18* (2013.01); *H02K 2213/12* (2013.01); *H02K 1/148* (2013.01)
USPC ......................................................... 310/179

(58) Field of Classification Search
USPC ............................ 310/208, 71, 112–114, 179
See application file for complete search history.

(56) References Cited

U.S. PATENT DOCUMENTS

| | | | | |
|---|---|---|---|---|
| 2,711,008 A | * | 6/1955 | Smith | 29/596 |
| 4,754,154 A | * | 6/1988 | Motodate | 290/46 |
| 4,968,911 A | * | 11/1990 | Denk | 310/216.007 |
| 6,011,339 A | * | 1/2000 | Kawakami | 310/208 |
| 6,373,160 B1 | * | 4/2002 | Schrodl | 310/114 |
| 6,787,961 B2 | * | 9/2004 | Neet et al. | 310/201 |
| 7,439,697 B2 | * | 10/2008 | Miyazaki et al. | 318/400.41 |
| 8,497,648 B2 | * | 7/2013 | Tagome et al. | 318/400.41 |
| 2006/0103137 A1 | | 5/2006 | Wobben | |
| 2011/0140421 A1 | * | 6/2011 | Scholte-Wassink | 290/44 |

FOREIGN PATENT DOCUMENTS

| | | |
|---|---|---|
| EP | 0449298 A1 | 10/1991 |
| EP | 1630931 A2 | 3/2006 |
| EP | 1792770 A2 | 6/2007 |

* cited by examiner

*Primary Examiner* — Dang Le

(57) ABSTRACT

A stator coil segment for an electro mechanical transducer, in particular a generator for generating electric energy from mechanical energy, includes a first coil which is arranged at a first radial position along a radial direction and adapted to be connected to an input terminal of a first power electronic device. The radial direction is perpendicular to a rotation axis of the electro mechanical transducer. Further, a second coil is arranged at a second radial position along the radial direction and adapted to be connected to an input terminal of a second power electronic device, wherein the second radial position is different from the first radial position.

11 Claims, 4 Drawing Sheets

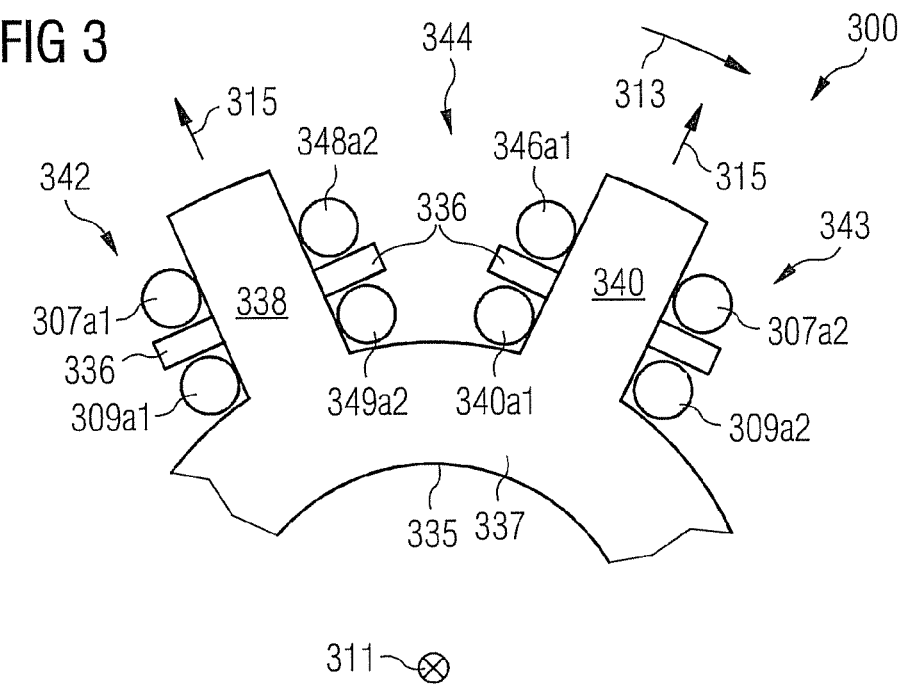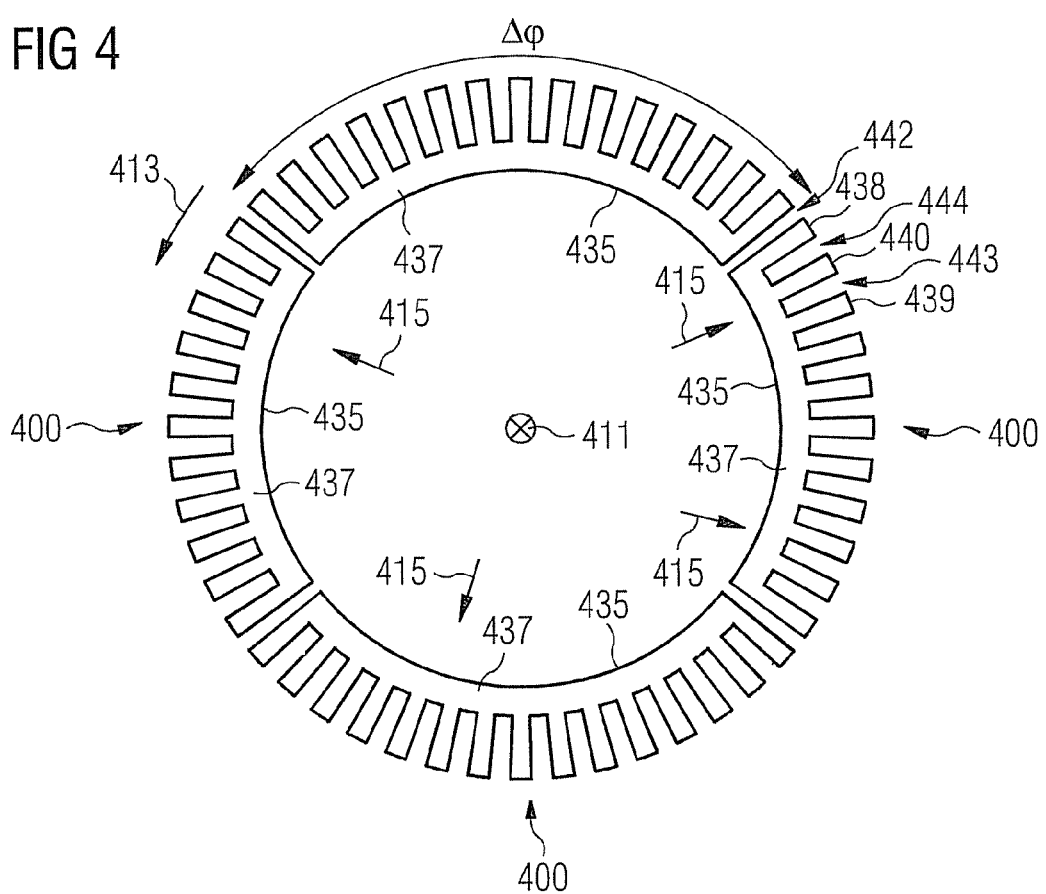

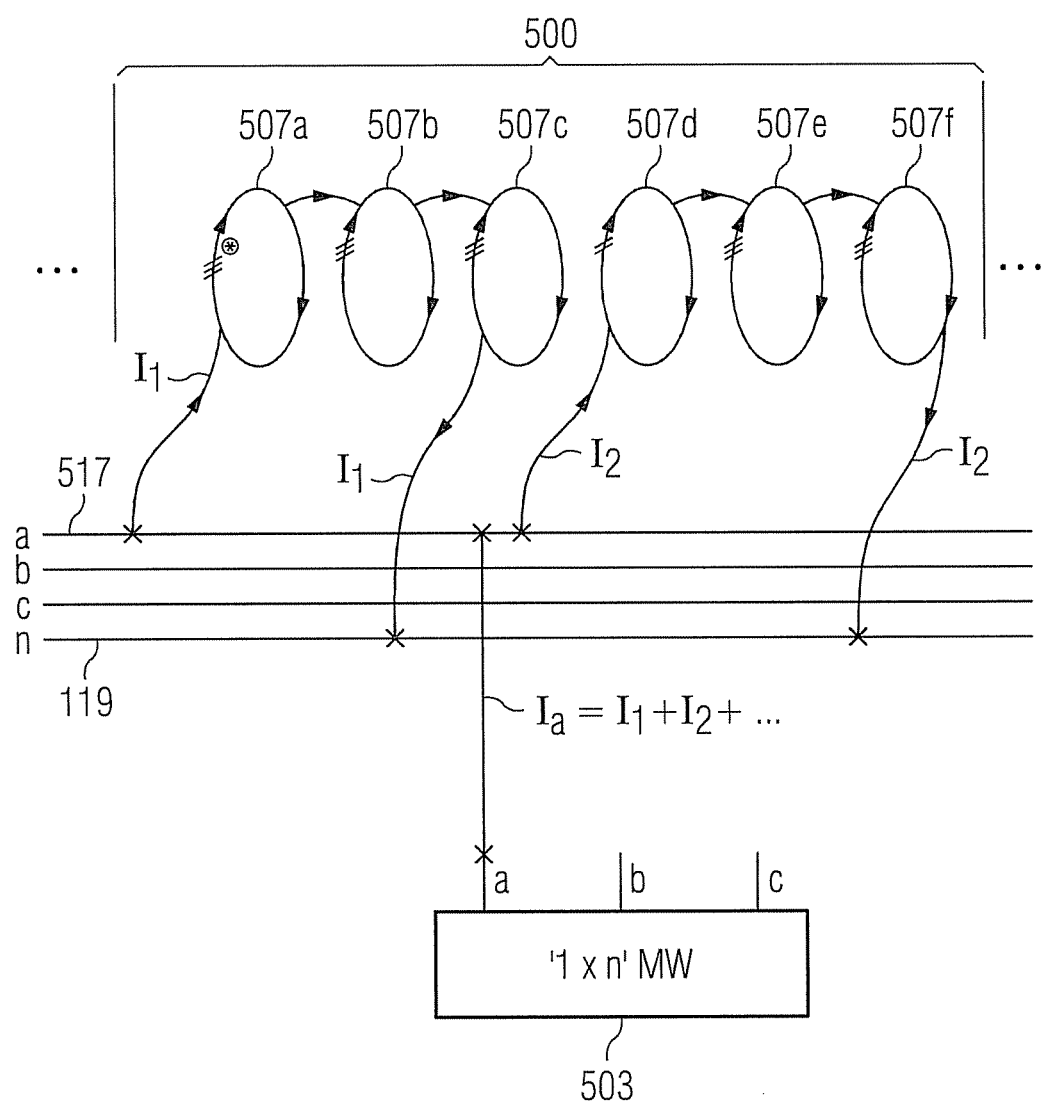

US 8,860,277 B2

STATOR COIL SEGMENT FOR AN ELECTRO MECHANICAL TRANSDUCER, IN PARTICULAR A GENERATOR AND ELECTRO MECHANICAL TRANSDUCER, IN PARTICULAR ELECTRIC GENERATOR

CROSS REFERENCE TO RELATED APPLICATIONS

This application claims priority of European Patent Office Application No. 11157316.8 EP filed Mar. 8, 2011. All of the applications are incorporated by reference herein in their entirety.

FIELD OF INVENTION

The present claimed invention relates to a stator coil segment for an electro mechanical transducer, in particular a generator for generating electric energy from mechanical energy, and to an electro mechanical transducer, in particular an electric generator comprising at least one stator coil segment. In particular, the present claimed invention relates to a stator coil segment for an electro mechanical transducer and to an electro mechanical transducer, in particular an electric generator, comprising at least one stator coil segment, wherein the electro mechanical transducer is fault-tolerant and at the same time produces less noise and/or vibration together with higher output efficiency, both during after-fault operation, compared to a conventional electro mechanical transducer, in particular a conventional generator. The stator coil segment, the electro mechanical transducer, in particular the electric generator, may in particular be used for a wind turbine generator.

ART BACKGROUND

A wind turbine system may comprise a wind turbine tower, a nacelle mounted at a top of the tower, wherein the nacelle houses a generator. One or more rotor blades may be connected to a rotation shaft of the generator. The rotation shaft may comprise one or more (permanent) magnets which are distributed along a circumferential direction (perpendicular to the rotation shaft). The generator may further include a stator coil arrangement comprising plural stator coils which are arranged such that a voltage and a current is induced upon rotation of the at least one magnet connected to the rotation shaft. Since a rotational speed of the rotor may depend on a wind speed, on an orientation of the nacelle relative to a wind direction, on a blade pitch angle of the one or more rotor blades and on other factors, the induced current and voltage (or electric energy) may oscillate with a variable frequency. For supplying the electric energy provided by the generator to an utility grid which supplies electric energy to one or more consumers, the electric energy (or voltage and/or current) generated by the generator needs to be transformed to a fixed frequency voltage and current (or energy flow), wherein the fixed frequency may correspond to a predetermined utility grid frequency, such as 50 Hz or 60 Hz.

For this purpose, the stator coil arrangement may be connected to a converter which may be adapted to convert the variable frequency input voltage provided by the generator to a fixed frequency output voltage or current (or energy flow). In particular, the converter may be considered as a particular representation of a power electronic device, in particular including one or more power transistors, such as isolated gate bipolar transistors (IGBT). A conducting state of the plural power transistors included in the converter may be controlled by one or more control circuits which switch the power transistors at a high frequency.

Thereby, there may be a risk that the converter fails. In case of such a failure the whole generator has to be shut down immediately until the faulty converter is fixed or replaced. In the meantime no electric energy can be produced by the wind turbine, reducing the efficiency of the wind turbine.

SUMMARY OF THE INVENTION

There may be a need for a stator coil segment for an electro mechanical transducer, in particular a generator for generating electric energy from mechanical energy, and there may also be a need for an electro mechanical transducer, in particular an electric generator, in particular for a wind turbine, wherein an efficiency of the stator coil segment and/or the electro mechanical transducer is improved, in particular wherein also a reliability and a durability of the stator coil segment and/or the electro mechanical transducer is improved.

This need may be met by the subject matter according to the independent claims. Advantageous embodiments of the present claimed invention are described by the dependent claims.

According to an embodiment, an advantageous stator coil segment and a stator coil arrangement composed of plural stator coil segments is provided, wherein the stator coil arrangement is in particular suitable for a wind turbine generator.

According to an embodiment, a stator coil segment (being in particular a static portion of a generator or a motor, wherein the segment may be in particular a circumferential segment, such as a segment spanning 0-30°, 0-60° or 0-90° of a circular stator coil arrangement) for an electro mechanical transducer (being in particular adapted for transforming mechanical energy to electrical energy, such as a generator, or for transforming electrical energy to mechanical energy, such as a motor), in particular a generator for generating electric energy from mechanical energy (in particular rotational energy provided by a rotation shaft of a wind turbine), wherein the stator coil arrangement comprises a first coil (in particular comprising one or more wire windings of an electrically conductive wire which may be covered by an insulation layer) arranged at a first radial position (such that for example a center of the first coil is arranged at the first radial position) along a radial direction and adapted to be connected to an input terminal of a first power electronic device (in particular a converter, when the electro mechanical transducer is a generator, or a power supply, when the electro mechanical transducer is a motor), wherein the radial direction is perpendicular to a rotation axis of the electro mechanical transducer (wherein in particular the rotation axis may be the rotation axis of the rotor shaft of the generator of the wind turbine); and a second coil (in particular also comprising one or more wire windings) arranged at a second radial position along the radial direction and adapted to be connected to an input terminal of a second power electronic device (in particular a converter), wherein the second radial position is different from the first radial position.

In particular, a center of the second coil may be arranged at the second radial position. In particular, the first coil and the second coil may be spaced apart along the radial direction. In particular, the first coil and the second coil may be spaced apart in the radial direction such that the first coil and the second coil are isolated from each other, in particular electrically isolated from each other but such that the first coil and the second coil are adjacent to each other such that there is no unnecessary empty space between the first coil and the second coil in the radial direction, except for an isolation layer, an isolation element or an isolation structure for electrically isolating the first coil from the second coil.

The first coil may be connected (in particular at a first end of the first coil) to an input terminal of the first power electronic device, such as a first converter and the second coil may be connected (in particular at one end thereof) to an input terminal of a second power electronic device, such as a second converter. Thereby, it is enabled that electrical energy is supplied from the first coil to the first converter and from the second coil to the second converter. Thus, even if one of the first converter and the second converter fails, and when the failing converter needs to be shut down, nevertheless electric energy is continuously being supplied to the functioning converter for improving the efficiency of a generator which comprises the stator coil arrangement assembled from plural stator coil segments according to an embodiment of the present claimed invention. The first coil and/or the second coil may be manufactured by winding a copper wire and isolating plural windings of the copper wire from each other.

According to an embodiment, the first coil and the second coil (in particular a center of the first coil and a center of the second coil) are arranged at a same (or at least approximately same) circumferential position (which may for example be represented an azimuthal angle φ of a cylinder coordinate system) along a circumferential direction which is perpendicular to the rotation axis (which may be defined by a z-axis of the cylinder coordinate system) and which is also perpendicular to the radial direction.

By positioning the first coil and the second coil at the same circumferential position an unbalance of forces in case of a failure of one of the first converter or the second converter, may be reduced to increase the durability of a generator comprising the plural stator coil segments. In particular, undesired force components acting on the rotor and stator components of the generator may not become significantly large in magnitude and may not result in fatigue of the components and may not result in significant noise and vibration. In particular, noise and/or vibration may be reduced compared to a conventional electro mechanical transducer, in particular a generator, in case of a failure of one of the first converter and the second converter.

Further, a minimum thickness of the permanent magnets (comprised in the rotor portion of the generator) in a generator may be determined by its withstand capability against the stator MMF (magnetomotive force) during the short circuit. By limiting the short circuit MMF, the magnets may be chosen thinner, if this also matches with the overall optimization of the generator design and cost. Since during a short circuit fault in one of the two converters, the number of turns of each coil set per slot is half compared to a one layer system, the short circuit MMF may be reduced by a factor 2 or similar. As a result, the magnets may be chosen thinner which may result in lower costs and/or higher performance of the generator.

In particular, the first coil and the second coil and also the first power electronic device and the second power electronic device may be rated at a nominal power (current or voltage) that is half of the nominal power when the stator coil segment would comprise only one coil instead of two coils which are spaced apart in the radial direction. Thereby, a current through the first coil and the second coil may be reduced compared to a conventional system. In case of short circuit fault in one of the converter systems, the faulty system is open circuited to prevent the flow of high short circuit currents. After the faulty set of coils is disconnected from the supply source, advantageously for the proposed double layer system, the other set of the coils which is not faulty will still provide half of the output power. During this so-called half power operation, since the current is uniformly distributed all around the machine circumference, there would be much smaller electromagnetic induced forces on components of the stator coil arrangement, the electro mechanical transducer or other components of the system, compared to conventional multi-converter systems in which the coils are arranged in only one layer As a result, there would be less noise and/or vibration and less wear of the stator and rotor components which increases the reliability and life time of the wind power generator which should have a cheap, reliable and efficient operation for about 20 years.

Advantageously, when one of the first converter and the second converter fails, the generator may still continue with half the nominal power. The magnetomotive force (MMF) may be proportional to the number of series turns within the first coil and the second coil, respectively, wherein the number of series turns per slot within the first coil and the second coil may be reduced by a factor of two compared to a conventional system.

In particular, a stator coil segment is provided having exactly a first coil and a second coil, thus forming two radial layers of coils. Further, the stator coil segment may be used to be connected to exactly two converters of a wind turbine system.

According to an embodiment of the claimed invention, the first coil and the second coil are arranged at a same (or at least at an approximately same) axial position along the rotation axis. Thereby, an unbalance of magnetomotive forces or electromagnetic forces acting on the components in case of a failure of one of the first converter and the second converter may be reduced, thus leading to a larger durability and reliability of a generator assembled from plural stator coil segments and plural magnets fixed at the rotation shaft.

According to an embodiment, the stator coil segment further comprises an insulation element (in particular an electric insulation element, in particular an insulation layer attached to the first coil and/or the second coil) arranged radially between the first coil and the second coil.

In particular, the insulation element may be provided between the first coil and the second converter to electrically isolate and/or separate the first coil from the second coil. In particular, during operation, which may in particular involve fast switching of the first power electronic device and/or the second power electronic device, a high voltage may occur between the first coil and the second coil. In particular, the high voltage may be due to an inexact synchronization of the switchings of the first power electronic device and the second power electronic device, in particular of the first converter and the second converter. Thus, in particular, the insulation element arranged radially between the first coil and the second coil may withstand higher voltages than an insulation or isolation layer with which the wire windings of the first coil or the wire windings of the second coil are electrically isolated from each other. Ideally, the first converter and the second converter may be switched in a synchronized manner, to reduce potential voltages between the first coil and the second coil.

According to an embodiment of the present claimed invention, the stator coil segment further comprises at least one further first coil (in particular 2, 3, 4, 5 or 6 to 20 further first coils) connected in series (i.e. behind each other) with the first coil (such that a common current, in particular a first current flows through all of the first coils and is supplied to the first power electronic device, in particular to the first converter)

and arranged at a different circumferential position than the first coil (such that in particular the plural first coils connected in series define a circumferential extent of the stator coil segment); and/or at least one further second coil (in particular 2, 3, 4, 5 or 6 to 20 further second coils) connected in series with the second coil and arranged at a different circumferential position than the second coil.

In particular, a number of further first coils may be equal to a number of further second coils. By providing series connected first coils and series connected second coils magnetomotive forces or electromagnetic forces acting on components of the system, in particular the generator, may be distributed across a larger spatial region, in particular improving a reliability and/or durability of the generator.

According to an embodiment of the stator coil segment, the at least one further first coil is arranged at the second radial position (thus at a different radial position than the first coil) and in particular at the same axial position as the first coil and/or wherein the least one further second coil is arranged at the first radial position (thus in particular at a different radial position than the second coil) and in particular at the same axial position as the second coil.

In particular, the first series connected coils and the second series connected coils may be transposed to lay equally in top and bottom of slots of a yoke, to balance the induced voltage and inductance. As a result of transposition, the inductances of the two coil sets become more balanced and ideally equal which in turn simplifies the control of the generator. Another advantage of transposition is that the Joule loss becomes balanced and ideally equal for the two coil sets, which in turn increases the output efficiency of the generator. In particular, within one stator coil segment there may be one, two, three, four or even more transpositions of the plural series connected first coil and the plural series connected second coils. Thus, in particular a number of first series connected coils being positioned at the first radial position may equal a number of series connected second coils arranged at the first radial position. In particular, a number of series connected first coils positioned at the second radial position may equal a number of series connected second coils positioned at the second radial position.

According to an embodiment, the stator coil segment further comprises a yoke (or a support structure) comprising ferromagnetic material (which may be magnetized by the first current flowing within the first coil and/or by the second current flowing within the second coil) for supporting the first coil and the second coil (in particular for accompanying the first coil and the second coil), the yoke comprising a base portion (in particular having a rotationally symmetric shape being rotationally symmetric with respect to the rotation axis of the electro mechanical transducer) and a first protrusion protruding from the base portion (in particular radially protruding from the base portion, in particular radially outwardly protruding from the base portion) such that at least a first slot (a void space between one or more protrusions, the void space enabling positioning at least a portion of the first coil and/or the second coil) and a second slot (which may provide a void space as well) are formed, wherein a first portion of the first coil and a first portion of the second coil are arranged in the first slot and wherein a second portion of the first coil and a second portion of the second coil are arranged in the second slot.

In particular, a distributed winding may be employed for providing two, three, four or even more different electrical phases to different input terminals of the first converter and the second converter. According to an embodiment, the first coil and the second coil provide the first current and the second current, respectively, the first current being of a same electrical phase as the second current. For generating more than one phase the stator coil segment may comprise other coils, wherein different winding techniques may be employed.

The yoke may advantageously increase a voltage and/or current induced within the first coil and/or the second coil upon rotation of one or more permanent magnets relative to the first coil and/or the second coil. Further, the yoke may advantageously support the first coil and the second coil to be maintained at fixed (stator) positions.

According to an embodiment, the first protrusion protrudes radially outwards. Further, in particular, also one or more further protrusions may protrude radially outwards. In other embodiments, the first protrusion and/or also other protrusions may protrude radially inwards or may protrude axially.

According to an embodiment of the claimed invention, the yoke further comprises a second protrusion (in particular at a different circumferential position than the first protrusion) protruding from the base portion of the yoke (in particular protruding radially outwards from the base portion), wherein on one side of the first protrusion the first slot is formed, wherein on the other side of the first protrusion and on one side of the second protrusion a third slot is formed, wherein on the other side of the second protrusion the second slot is formed such that the third slot is between the first protrusion and the second protrusion and between the first slot and the second slot.

Thus, in particular, the first coil is not arranged in slots adjacent to one protrusion, but the first coil is arranged in the first slot and the second slot, wherein the third slot is between the first slot and the second slot. Thereby, in particular when plural phases, such as three phases, are supported, a distributed winding of coils corresponding to the different phases may be employed.

According to an embodiment of the claimed invention, the stator coil segment further comprises at least one other first coil (in particular providing another first current representing a different phase than the first current) arranged at the first radial position (thus at a same radial position as the first coil) and adapted to be connected to another input terminal (associated with another phase) of the first power electronic device (in particular the first converter); at least one other second coil (providing another second current having the other phase, in particular the same phase as the other first current flowing through the other first coil) arranged at the second radial position (thus at the same radial position as the second coil) and adapted to be connected to another input terminal (associated with the other phase) of the second power electronic device (in particular the second converter), wherein in particular a first portion of the other first coil and a first portion of the other second coil are arranged in the third slot, according to an embodiment of a distributed winding.

Further, there may be more than one other first coil and more than one other second coil provided, wherein each of the at least one other first coil and the at least one other second coil may represent or may be provided for enabling current flow having a particular electrical phase. In total, in particular three phases may be supported.

According to an embodiment of the stator coil segment, the stator coil segment further comprises at least one third coil (or two, three, four, five or even more third coils) arranged at at least one third radial position different from the first radial position and different from the second radial position and adapted to be connected to an input terminal of at least one third power electronic device.

Thus, in particular the at least one third coil may represent a further layer of coils stacked on top of a radial layer formed by the first coils or the second coils in the radial direction. In particular, a number of layers may correspond to a number of power electronic devices, in particular a number of converters. Thereby, in case of a failure of one of the power electronic devices, in particular one of the converters, a reduction of the nominal power output may be decreased, to thus improve an efficiency of the generator comprising the plural stator coil segments.

According to an embodiment of the claimed invention, the stator coil segment further comprises a first bus bar (in particular an electrical conductor for conducting the first current, in particular a high current) connected to one end of the first coil (in particular to one end of the wound wire forming the first coil); a second bus bar connected to one end of the second coil (in particular to one end of the wound wire forming the second coil), wherein the first bus bar is connectable to the input terminal of the first power electronic device and the second bus bar is connectable to the input terminal of the second power electronic device, wherein in particular another end of the first coil (in particular another end of the wire forming the first coil) and another end of the second coil (in particular a second end of the wound wire forming the second coil) are connectable or connected to a ground (or earth) electric potential. The first bus bar and the second bus bar advantageously allow conducting the first current and/or the second current to the first electronic device and/or the second power electronic device.

According to an embodiment of the present claimed invention, an electro mechanical transducer, in particular an electric generator, in particular for a wind turbine, is provided, wherein the electro mechanical transducer comprises plural stator coil segments arranged side by side in a circumferential direction to form an annular stator coil arrangement, wherein each stator coil segment is configured according to an embodiment as described above; and at least one (in particular permanent) magnet (in particular a plurality of magnets arranged at different circumferential positions), arranged to be inductively coupled to at least one of the first coil and the second coil of at least one the plural stator coil segments, wherein the magnet is rotatable around the rotation axis.

In particular, the at least one magnet, in particular the plurality of magnets, is fixedly connected to the rotation axis. In particular, the magnet may be arranged radially outwards or radially inwards from the first coil and the second coil. Due to the arrangement of the first coil and the second coil at each of the stator coil segments comprised in the electro mechanical transducer the electro mechanical transducer may have an improved efficiency, reliability and durability compared to a conventional electro mechanical transducer.

In particular, the electro mechanical transducer may comprise exactly four stator coil segments, six stator coil segments, eight stator coil segments or ten to twenty stator coil segments. In particular, a number of stator coil segments comprised in the electro mechanical transducer may depend on a diameter of the annular stator coil arrangement assembled from the plural stator coil segments. In particular, the number of plural stator coil segments comprised in the electro mechanical transducer may depend on a curvature of the stator coil segment.

According to an embodiment of the claimed invention, the electro mechanical transducer further comprises a first power electronic device, in particular a first converter, having an input terminal of the first power electronic device, wherein the input terminal of the first power electronic device is connected to the first coil (in particular connected to an end of the wire forming the first coil); and a second power electronic device, in particular a second converter, having an input terminal of the second power electronic device, wherein the input terminal of the second power electronic device is connected to the second coil (in particular to an end of a wound wire forming the second coil).

Further, in particular, the electro mechanical transducer may comprise other coils for conducting currents having other phases, such that in total two phases, three phases, four phases, five phases, six phases or even more phases are supported. In particular, three phases may be supported and the first converter and the second converter may comprise each three different input terminals for inputting currents or energy signals corresponding to three different phases, wherein the phases are in particular shifted relative to each other by 120°.

It has to be noted that embodiments of the claimed invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present claimed invention are apparent from the examples of embodiment to be described hereinafter and are explained with reference to the examples of embodiment. The claimed invention will be described in more detail hereinafter with reference to examples of embodiment but to which the invention is not limited.

BRIEF DESCRIPTION OF THE DRAWINGS

Embodiments of the present claimed invention are now described with reference to the accompanying drawings. The claimed invention is not restricted to the illustrated or described embodiments.

FIG. 3 schematically illustrates a portion of a stator coil segment as seen along an axial direction perpendicular to a radial direction and perpendicular to a circumferential direction;

FIG. 4 schematically illustrates a portion of a generator as seen along an axial direction; and FIG. 5 schematically illustrates an electro mechanical transducer according to a comparative example.

DETAILED DESCRIPTION

Figure 1:
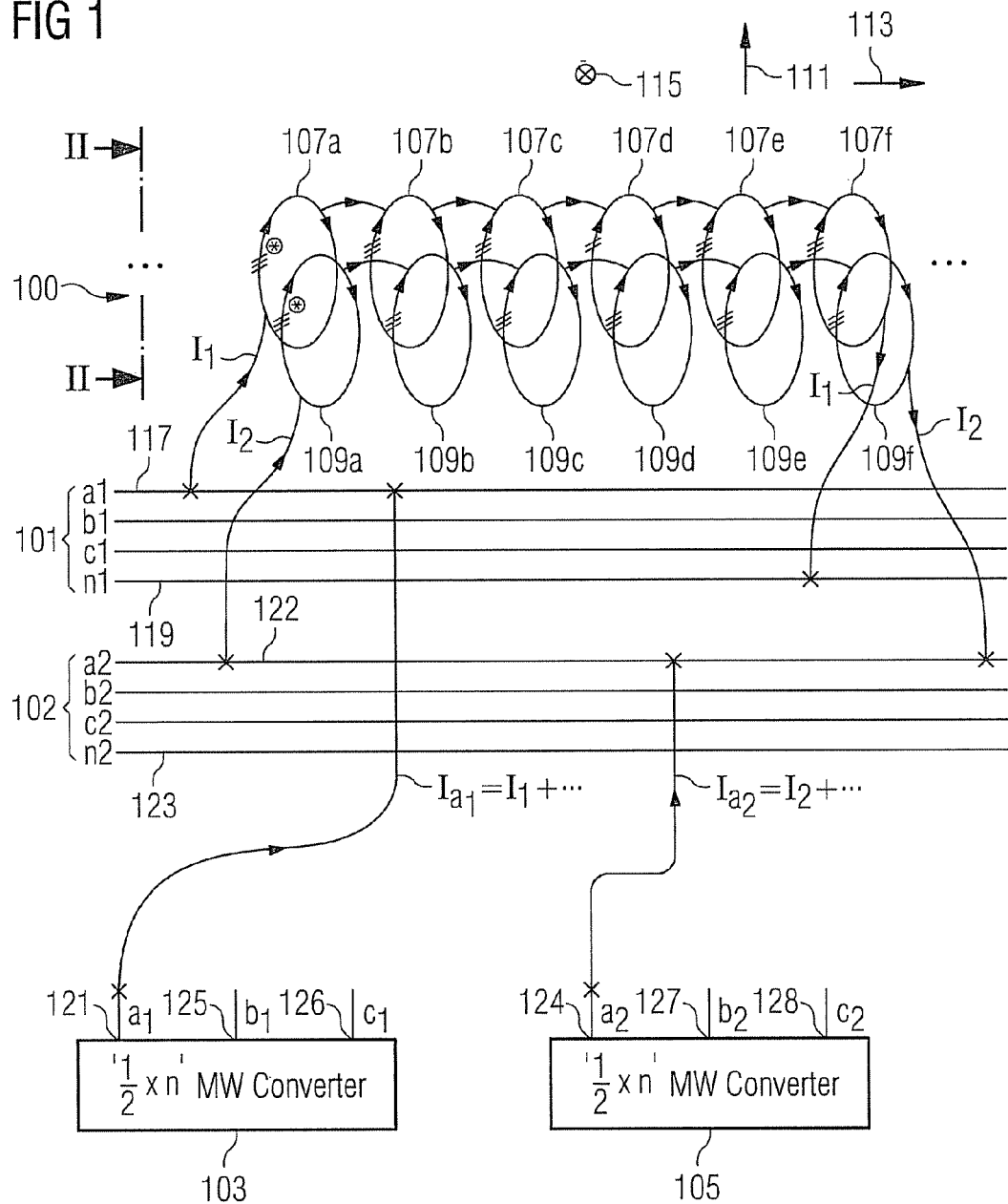
FIG. 1 schematically illustrates a perspective view along a radial direction of a stator coil segment connected to a bus bar system which is connected to two converters to form an electro mechanical transducer.

The illustration in the drawings is in schematic form. It is noted that in different figures, similar or identical elements are provided with the same reference signs or with reference signs, which are different from the corresponding reference signs only within the first digit.

FIG. 1 schematically illustrates (approximately from a radial direction 115) a stator coil segment 100 which is connected to bus bar systems 101, 102 which in turn are connected to a first connector 103 and a second connector 105, respectively. The stator coil segment 100 comprises a set of six series connected first coils 107a to 107f, collectively denoted by reference sign 107, and a set of series connected second coils 109a to 109f, collectively denoted by reference sign 109.

The stator coil segment 100 may be used for a generator, wherein a plurality of magnets rotates around a rotation axis 111. The rotation axis 111 corresponds to an axial direction of the generator. The set of first coils 107 as well as the set of second coils 109 extend in the circumferential direction 113, for example across an angle interval of 90°. The illustration of FIG. 1 shows the stator coil segment which is actually a portion of an arc flattened into the drawing plane such that the circumferential direction 113 and the axial direction 111 form a rectangular coordinate system. A radial direction 115 is perpendicular to the axial direction 111, perpendicular to the circumferential direction 113 and thus perpendicular to the drawing plane of FIG. 1.

In particular, the set of first coils 107 is spaced apart from the set of second coils 109 in the radial direction 115. Further, the set of first coils 107 is electrically isolated from and separated from the set of second coils 109. Each of the coils 107 comprises one or more wire windings of a conductive wire, wherein the wire windings are isolated from each other.

One end of the first coil 107a (being the first coil in the set of series connected first coils 107a-107f) is connected to the first bus bar 117 (also labeled as a1). An end of the first coil 107f (being the last first coil in the set of series connected first coils 107a-107f) is connected to a first ground bus bar 119 (also labeled as n1 in FIG. 1). The first bus bar 117 is connected to an input terminal 121 of the first converter 103. Through the set of first coils 107a-107f the current I1 is induced upon rotation of (not illustrated) one or more permanent magnets which are inductively coupled to the set of first coils 107a-107f, wherein the magnets rotate around the rotation axis 111.

The number of wire turns in each of the first coils 107a-107f is half of the number of turns in a conventional stator coil segment, wherein only one coil is provided at a particular circumferential position along the circumferential direction.

In particular, the second coil 109a has a different radial position than the first coil 107a, but the second coil 109a has a same axial position and a same circumferential position as the first coil 107a. The same holds for the corresponding pairs 107b, 109b; ... ; 107f, 109f, respectively. An end of a wire forming the second coil 109a is connected to a second bus bar 122 and an end of the wire forming the second coil 109f is connected to a second neutral bus bar 123 (also labeled as n2 in FIG. 1). The second bus bar 122 in turn is connected to an input terminal 124 of the second converter 105.

In particular, the first converter 103 and the second converter 105 are configured to transform a variable frequency energy stream or current or voltage signal to a fixed frequency energy stream or voltage or current signal, having in particular a frequency of 50 Hz or 60 Hz to be provided to a utility grid (not illustrated). Thereby, the input terminal 122 of the first converter receives the first current I1 having a first phase. Further input terminals 125 and 126 receive currents induced in further coils (not illustrated in FIG. 1), wherein these further coils have different phases than the current I1.

In analogy the second converter 105 has further input terminals 127 and 128 for receiving current having other phases than the second current I2. In particular, the first current I1 and the second current I2 have the same phases. This is, because the set of first coils 107a-107f have corresponding same circumferential positions as the set of second coils 109a-109f.

According to the arrangement illustrated in FIG. 1 a 2-layer, 2-converter generator system is provided. In particular, the first coils 107a-107f and the second coils 109a-109f are arranged in a double-layer configuration being spaced apart in the radial direction 115. Compared to the conventional system illustrated in FIG. 5 a reliability and an efficiency is increased, since when one of the first converter 103 or the second converter 105 fails, the generator may continue to operate, whereas in FIG. 5 failure of the converter 503 requires shutting down the generator. In particular, three coils 507a, 507b and 507c of the comparative example illustrated in FIG. 5 are connected in series and one end thereof is connected to a bus bar 517, whereas the other end is connected to the neutral bus bar 119. Each coil 507a-507f is composed of a number of series turns, wherein a number of the series turns is N, such that the coils 507a-507f each fill a slot in a yoke.

In contrast, the number of turns of the first coils 107a-107f and the second coils 109a-109f is N/2. Thereby only half of the stator slots (as for example illustrated in FIG. 3) is filled by either the first coils 107a-107f or the second coils 109a-109f. However, when the first coils 107a-107f and the second coils 109a-109f are stacked on top of each other in the radial direction 115, the stator slot(s) are essentially filled.

The system illustrated in FIG. 1 may in particular be applied to direct drive generators whose stator may be composed of several stator segments to facilitate the manufacturing and logistics, thereby lowering the cost. Therefore, it may be necessary that an integer multiple of sets of coils in series fill the complete span of one segment, since the segments and insertion of coils may be manufactured separately for one segment from another.

Figure 2:
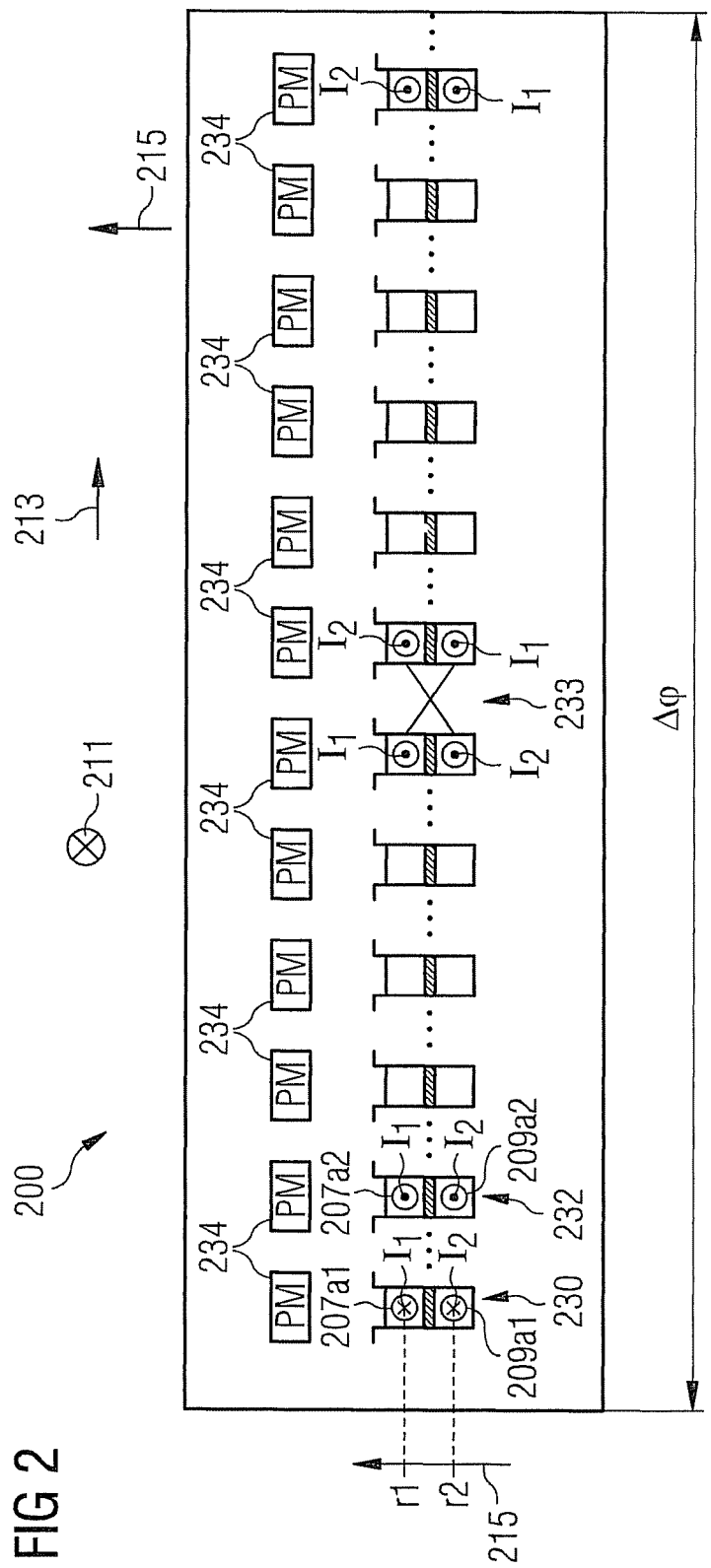
FIG. 2 schematically illustrates the electro mechanical transducer illustrated in FIG. 1 including permanent magnets when view in an axial direction along a direction labeled in FIG. 1 as II.

FIG. 2 schematically illustrates portions of a generator including the stator coil segment 100 illustrated in FIG. 1. FIG. 2 illustrates the generator portion along the axial direction 211, wherein the generator portion (actually being a portion of an arc) is flattened to lie within the drawing plane of FIG. 2. In particular, the axial direction is labeled as reference sign 211, the circumferential direction is labeled by a reference sign 213 and the radial direction is labeled by reference sign 215.

A first portion 207a1 of the first coil 207a is arranged in a first slot 230 and a second portion 207a2 of the first coil 207a is arranged in a second slot 232. In between the two slots 230 and 232, zero, one, two, three or even more slots may be arranged according to different embodiments of the claimed invention. Further, a first portion 209a1 of the second coil 209a is also located in the first slot 230 and a second portion 209a2 of the second coil 209a is located in the second slot 232. Plural magnets 234 are arranged to be inductively coupled to the set of first coils 207a-207f and the set of second coils 209a-209f.

As can be seen from FIG. 2, some of first coils 207a-207f are arranged at a first radial position r1 and some of second coils 209a-209f are arranged at a second radial position r2 different from the first radial position r1. As can be seen from FIG. 2, some other of first coils 207a-207f are arranged at a second radial position r2 and some other of the second coils 209a-209f are arranged at a first radial position r1 different from the first radial position r2. Between these different groups there is a transposition region 233, where wires of the first and second coils cross each other in the radial direction.

In particular, between the first coils 207a-207f and the second coils 209a-209f a set of corresponding insulation elements 236 is arranged to electrically isolate the first coils from the second coils. The stator coil segment 200 extends in a circumferential direction 213 to an extent Δϕ. Δϕ may for example be 30°, 60°, 90°, 120°, according to exemplary embodiments.

FIG. 3 illustrates a cross-sectional view of a portion of a stator coil segment 300. The stator coil segment 300 comprises a yoke 335 comprising a base portion 337 and at least a first protrusion 338 and a second protrusion 340. On one side of the first protrusion 338 a first slot 342 is formed, wherein on the other side of the first protrusion 338 and on one side of the second protrusion 340 a third slot 344 is formed. On the other side of the second protrusion 340, a second slot 343 is formed such that the third slot 344 is between the first protrusion 338 and the second protrusion 340 and between the first slot 342 and the second slot 343.

In particular, the first protrusion 338 and the second protrusion 340 protrude along the corresponding radial direction 315. A first portion 307a1 of the first coil 307a and a first portion 309a1 of the second coil 309a are arranged in the first slot 342. A second portion 307a2 of the first coil 307a and a second portion 309a2 of the second coil 309a are arranged in the second slot 343, wherein the insulating element 336 is arranged radially between the first coil 307a and the second coil 309a in both the first slot 342 and the second slot 343.

In the third slot 344 on one side of the second protrusion 340, a first portion 340a1 of another first coil 340a and a first portion 346a1 of another second coil 346a is arranged. The other first coil 340a and the other second coil 346a is provided to supply another current (another first current and another second current, respectively, in particular having a different phase than the first current and the second current) to the first converter 103 and the second converter 105, in particular via one of the input terminals 125, 127 or 126 and 128, respectively. Further, within the third slot 344 at the other side of the first protrusion 338 a second portion 348a2 of another further first coil 348a and a second portion 349a2 of another further second coil 349a are arranged to provide current signals (having an even different phase) to the first converter 103 and 105, respectively which may in particular be supplied to the converters via one of the terminals 125, 127 or 126, 128. These currents provide further phases.

FIG. 4 schematically illustrates a yoke 435 comprising plural stator coil segments (in particular comprising four stator coil segments) which may be configured as illustrated in FIGS. 1, 2 and/or 3. FIG. 4 depicts the yoke 435 as seen along the axial direction 411. The yoke 435 comprises a base portion 437, a first protrusion 438, a second protrusion 440 and a third protrusion 439 providing a first slot 442, a second slot 443 between the second protrusion 440 and the third protrusion 439, and providing between the first protrusion 438 and the second protrusion 440 the third slot 444.

In particular, four stator coil segments 400 may form the annular ring of the yoke arrangement 435. As explained above particularly with reference to FIGS. 2 and 3, the first coil and the second coil (and also other first coils and other second coils and also other further other first coils other further other second coils) are arranged within the first slot 442, the second slot 443 and the third slot 444.

Thereby, the first coils (or at least some of them) are arranged at a first radial distance and the second coils (or at least some of them) are arranged at a second radial position different from the first radial position. The resulting stator coil segments may be assembled to form an annular structure as illustrated in FIG. 4. Additionally, rotatably supported permanent magnets (not illustrated in FIG. 4) may be provided positioned radially outwards from the protrusions 438, 440 and 439. In particular, the number of slots may be calculated as 2*m*(number of series coils per phase) in the set of first coils or second coils in one stator coil segment. Thereby, this equation serves as a constraint to determine the number of slots, stator segments and/or series coils for the proposed multi-converter multilayer winding generator.

It should be noted that the term "comprising" does not exclude other elements or steps and "a" or "an" does not exclude a plurality. Also elements described in association with different embodiments may be combined.

The invention claimed is:

1. Stator coil segment for an electro mechanical transducer, in particular a generator for generating electric energy from mechanical energy, the stator coil arrangement comprising:

a first coil arranged at a first radial position along a radial direction and connected to an input terminal of a first converter to supply electrical energy to the first converter, wherein the radial direction is perpendicular to a rotation axis of the electro mechanical transducer; and a second coil arranged at a second radial position along the radial direction and connected to an input terminal of a second converter to supply electrical energy to the second converter, wherein the first converter and the second converter are distinct devices and operate independently from one another such that failure of one of the first converter and the second converter does not result in failure of the other of the first converter and the second converter;

wherein the second radial position is different from the first radial position; and a yoke comprising ferromagnetic material for supporting the first coil and the second coil, wherein the yoke comprises a base portion and a first protrusion protruding from the base portion such that at least a first slot and a second slot are formed, wherein a first portion of the first coil and a first portion of the second coil are arranged in the first slot, and wherein a second portion of the first coil and a second portion of the second coil are arranged in the second slot.

2. Stator coil segment according to claim 1, wherein the first coil and the second coil are arranged at a same circumferential position along a circumferential direction which is perpendicular to the rotation axis and perpendicular to the radial direction.

3. Stator coil segment according to claim 1, wherein the first coil and the second coil are arranged at a same axial position along the rotation axis.

4. Stator coil segment according to claim 1, further comprising:

an insulation element arranged radially between the first coil and the second coil.

5. Stator coil segment according to claim 1, further comprising:

at least one further first coil connected in series with the first coil and arranged at a different circumferential position than the first coil; and/or at least one further second coil connected in series with the second coil and arranged at a different circumferential position than the second coil.

6. Stator coil segment according to claim 5, wherein the at least one further first coil is arranged at the second radial position, and in particular at the same axial position as the first coil, and/or wherein the least one further second coil is arranged at the first radial position, and in particular at the same axial position as the second coil.

7. Stator coil segment according to claim 1, wherein the first protrusion protrudes radially outwards.

8. Stator coil segment according to claim 1,
wherein the yoke further comprises a second protrusion protruding from the base portion of the yoke,
wherein on one side of the first protrusion the first slot is formed,
wherein on the other side of the first protrusion and on one side of the second protrusion a third slot is formed, and
wherein on the other side of the second protrusion the second slot is formed such that the third slot is between the first protrusion and the second protrusion and between the first slot and the second slot.

9. Stator coil segment according to claim 8, further comprising:
at least one other first coil arranged at the first radial position and connected to another input terminal of the first converter;
at least one other second coil arranged at the second radial position and connected to another input terminal of the second converter,
wherein a first portion of the other first coil and a first portion of the other second coil are arranged in the third slot.

10. Stator coil segment according to claim 1, further comprising:
a first bus bar connected to one end of the first coil;
a second bus bar connected to one end of the second coil,
wherein the first bus bar is connectable to the input terminal of the first converter and the second bus bar is connectable to the input terminal of the second converter, and
wherein another end of the first coil and another end of the second coil are connected to a ground electric potential.

11. Electro mechanical transducer comprising:
plural stator coil segments arranged side by side in a circumferential direction to form an annular stator coil arrangement,
wherein each stator coil segment comprises:
a first coil arranged at a first radial position along a radial direction and connected to an input terminal of a first converter to supply electrical energy to the first converter, wherein the radial direction is perpendicular to a rotation axis of the electro mechanical transducer; and
a second coil arranged at a second radial position along the radial direction and connected to an input terminal of a second converter to supply electrical energy to the second converter, wherein the second radial position is different from the first radial position;
wherein the first converter and the second converter are distinct devices and operate independently from one another such that failure of one of the first converter and the second converter does not result in failure of the other of the first converter and the second converter;
a yoke comprising ferromagnetic material for supporting the first coil and the second coil,
wherein the yoke comprises a base portion and a first protrusion protruding from the base portion such that at least a first slot and a second slot are formed,
wherein a first portion of the first coil and a first portion of the second coil are arranged in the first slot,
wherein a second portion of the first coil and a second portion of the second coil are arranged in the second slot, and
at least one magnet which is arranged to be inductively coupled to at least one of the first coil and the second coil of at least one of the plural stator coil segments,
wherein the magnet is rotatable around the rotation axis.

* * * * *